United States Patent
Chang et al.

(10) Patent No.: US 11,503,122 B2
(45) Date of Patent: Nov. 15, 2022

(54) SYSTEMS AND METHODS FOR UTILITIES-BASED NETWORK MANAGEMENT

(71) Applicant: Verizon Patent and Licensing Inc., Basking Ridge, NJ (US)

(72) Inventors: Patricia R. Chang, San Ramon, CA (US); Donna L. Polehn, Mercer Island, WA (US); Jin Yang, Orinda, CA (US); Arda Aksu, Lafayette, CA (US); Lalit R. Kotecha, San Ramon, CA (US); Vishwanath Ramamurthi, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 116 days.

(21) Appl. No.: 17/008,116

(22) Filed: Aug. 31, 2020

(65) Prior Publication Data
US 2022/0070260 A1  Mar. 3, 2022

(51) Int. Cl.
*H02J 3/00* (2006.01)
*H04L 67/12* (2022.01)
*H04W 4/38* (2018.01)
*G06T 7/50* (2017.01)

(52) U.S. Cl.
CPC ............... *H04L 67/12* (2013.01); *G06T 7/50* (2017.01); *H02J 3/003* (2020.01); *H04W 4/38* (2018.02); *G06T 2207/10028* (2013.01); *G06T 2207/10048* (2013.01); *G06T 2207/30184* (2013.01)

(58) Field of Classification Search
CPC . H04L 67/12; G06T 7/50; G06T 2207/10028; G06T 2207/10048; G06T 2207/30184; H04W 4/38; H02J 3/003
See application file for complete search history.

(56) References Cited

U.S. PATENT DOCUMENTS

| | | | |
|---|---|---|---|
| 2005/0055590 A1* | 3/2005 | Farkas | G06F 9/5094 713/320 |
| 2009/0017816 A1* | 1/2009 | Chainer | H05K 7/20836 455/425 |
| 2016/0087909 A1* | 3/2016 | Chatterjee | H04L 47/70 709/226 |
| 2017/0070567 A1* | 3/2017 | Lee | H04L 67/1008 |
| 2019/0035146 A1* | 1/2019 | Nowicki | G01S 7/4808 |
| 2019/0108747 A1* | 4/2019 | Stenning | F16P 3/00 |
| 2019/0138934 A1* | 5/2019 | Prakash | G06V 10/95 |
| 2020/0242471 A1* | 7/2020 | Busch | G06K 9/6256 |
| 2021/0248822 A1* | 8/2021 | Choi | G06K 9/6289 |

* cited by examiner

*Primary Examiner* — Chris Parry
*Assistant Examiner* — Hassan A Khan

(57) ABSTRACT

An illustrative network management system obtains sensor data from one or more sensors at a network facility at which network equipment of a communication network is deployed. The sensor data includes image data representing imagery of the network facility. The system determines a utilization of a utility at the network facility based on the sensor data and performs, based on the utilization, a management operation for the communication network. Corresponding methods and systems are also described.

20 Claims, 8 Drawing Sheets

SYSTEMS AND METHODS FOR UTILITIES-BASED NETWORK MANAGEMENT

BACKGROUND INFORMATION

Network equipment of a modern communication network is typically deployed at distributed geographic locations called network sites. At a network site, a network facility (e.g., a structure such as a building) houses network equipment (e.g., computing devices implementing network servers, routers, gateways, etc.) and provides utilities such as physical space, electrical power, and cooling that support deployment and operation of the network equipment at the network site. The finite nature of the utilities available at network facilities may limit the deployment and operation of network equipment, particularly for network equipment that consumes large amounts of power, generates significant heat, and/or requires a large physical space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
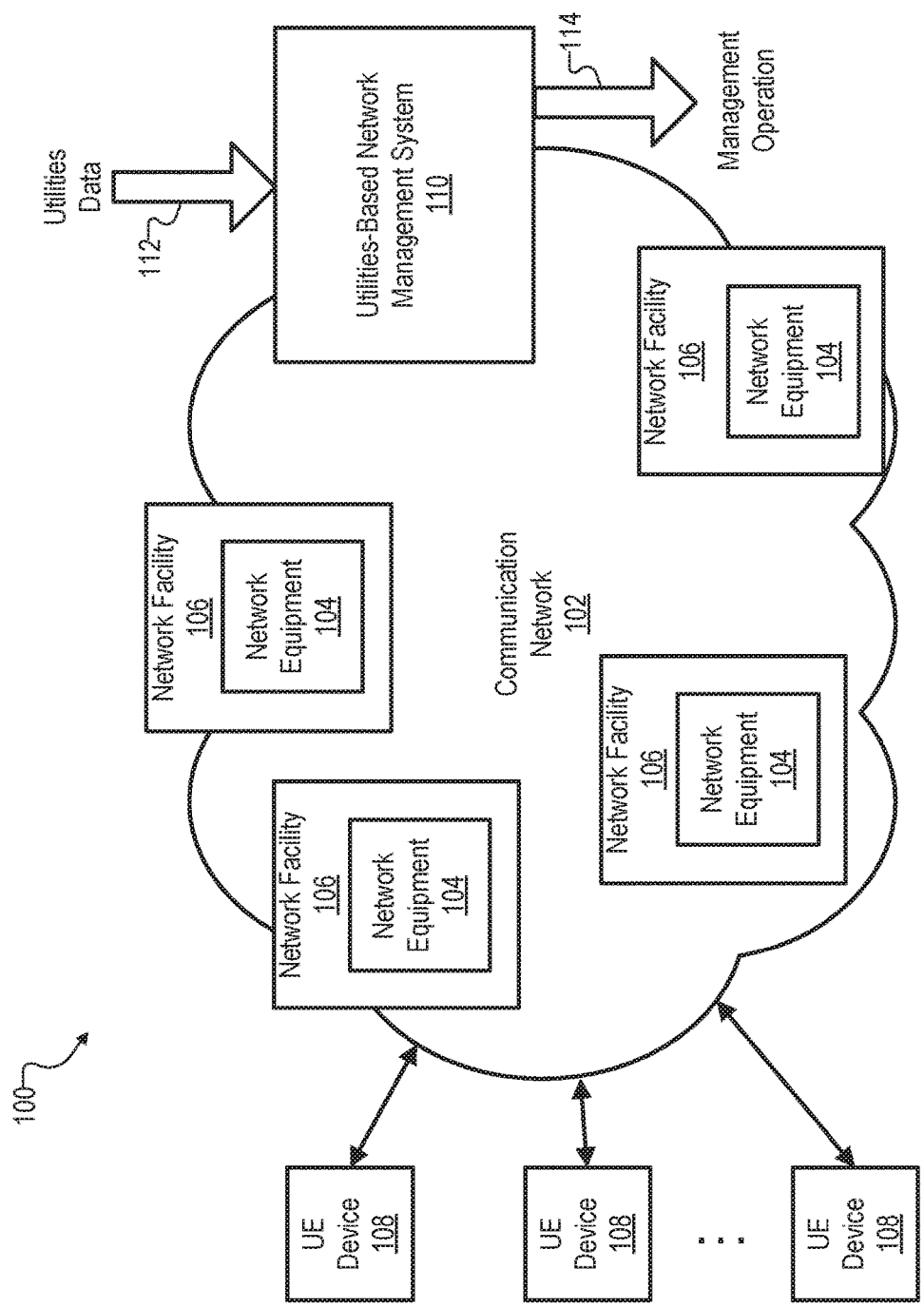
FIG. 1 shows an illustrative configuration of a communication network in which a utilities-based network management system is implemented according to embodiments described herein.

Systems and methods for utilities-based network management are described herein. The systems and methods may manage a communication network by identifying and performing network management operations based on utilities at network facilities at which network equipment of the communication network is deployed. For example, a network management system may be configured to obtain utilities data associated with a network facility, determine a utilization of the network facility based on the utilities data, and perform a management operation based on the utilization of the network facility. In certain examples, the utilities data may include sensor data obtained from one or more sensors deployed at the network facility, such as image data that is obtained from one or more imaging devices and represents imagery of the network facility captured by the imaging devices. In such examples, the network management system may determine a utilization of the network facility, such as a utilization of a utility at the network facility, based at least in part on the image data (e.g., by performing image processing operations and analyzing the imagery of the network facility) and/or other sensor data.

By determining utilization of utilities at network facilities and performing network management operations based at least in part on the utilization of the utilities at the network facilities, the network management system may facilitate optimization of the communication network. For example, optimization opportunities and/or potential problems associated with utilization of utilities at network facilities may be identified and appropriate management operations performed to facilitate optimization of the utilization of the utilities at the network facilities. Additionally or alternatively, deployment plans and designs for network equipment may be generated and implemented based on utilizations of utilities at network facilities (e.g., based on historical, current, and/or predicted utilizations of utilities at network facilities).

To illustrate an example, certain multi-access edge compute (MEC) servers require significant power and generate significant heat at a network facility. The network management system may obtain utilities data for the network facility, determine utilizations of utilities such as power, air temperature, and cooling requirements at the network facility, and perform, based on the utilizations, one or more management operations configured to optimize the utilizations of power, air temperature, and/or cooling equipment at the network facility. The management operations may facilitate optimized deployment and/or operation of MEC servers at the network facility. Examples of such management operations are described herein.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 shows an illustrative configuration 100 of a communication network 102 that includes network equipment 104 deployed at distinct network facilities 106 distributed throughout communication network 102. User equipment (UE) devices 108 and certain network equipment 104 may be communicatively coupled to one another such that UE devices 108 may request and receive one or more services by way of communication network 102 (e.g., from network equipment 104). Network equipment 104 may be configured to provide certain services to UE devices 108. Illustrative services may include, without limitation, network connectivity services, data communication services, and/or any services that use network connectivity and/or data communication. Examples of such services include, but are not limited to, data streaming services, mobile application services, software-as-a-service services, platform-as-a-service services, infrastructure-as-a-service services, multi-access server services (e.g., cloud computing services and/or multi-access edge computing (MEC) services), communication services, and digital content delivery services.

Each UE device 108 may be implemented as any computing device configured to connect to communication network 102 and to request and/or receive services by way of communication network 102, such as services provided by network equipment 104 by way of communication network

302. UE devices 108 may be associated with one or more users. For example, a UE device 108 implemented as a personal computer (e.g., a desktop or laptop computer, etc.) or a mobile device (e.g., a smartphone or tablet device, etc.) may be controlled by a user of the UE device 108. Other types of UE devices (e.g., certain Internet-of-Things (IoT) devices and embedded systems such as may be employed in smart appliances, specialized testing or automation equipment, etc.) may not be associated with a specific user, or may be one of multiple UE devices 108 controlled by a single user.

Each instance of network equipment 104 deployed at a network facility 106 may include or be implemented by a computing system (e.g., a server, a blade server, an edge server, a set of servers at a single site, etc.) that includes a set of computing resources (e.g., memory, processing, and/or other computing resources). The computing resources may be provided using a combination of hardware and software resources.

Network equipment 104 may represent various types of network equipment deployed throughout communication network 102. For example, network equipment 104 may include routers, gateways, hubs (e.g., CRAN and/or DRAN hubs), radio transceivers, antennas, radio access network (RAN) equipment, servers, and/or any other types of network equipment. In certain examples, certain network equipment 104 includes multi-access servers that are each accessible to multiple UE devices 108 and configured to perform processing and data services for the UE devices 108. Such multi-access servers may include multi-access edge compute (MEC) servers implemented within a provider network of communication network 102 (e.g., so as to be near the edge of communication network 102 where UE devices 108 connect to the network) and/or other multi-access servers (e.g., cloud servers) implemented farther from the edge of the provider network (e.g., within external networks that are accessible to UE devices 108 by way of the provider network).

Communication network 102 may represent various networks or parts of networks used to enable communication between UE devices 108 and network equipment 104. To this end, communication network 102 may implement or employ any suitable communication technologies, devices, media, protocols, or the like as may serve a particular implementation. In some examples, communication network 102 may include a provider network and/or additional networks outside of the provider network (e.g., external networks associated with the Internet).

A provider network included within communication network 102 may be implemented as a provider-specific wired or wireless communications network (e.g., a cellular network used for mobile phone and data communications, a 5G network or a network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communication services to UE devices 108, including radio spectrum allocation, wireless network infrastructure, back haul infrastructure, customer care, provisioning of devices, and so forth.

In various examples, a provider network included within communication network 102 may include or consist of various network resources that may be associated with network equipment 104 such as MEC servers. For instance, one or more radio access network (RAN) resources may directly communicate with UE devices 108 and may provide access to MEC servers integrated with and/or communicatively coupled to the RAN resources, one or more transport access point (TAP) resources may communicate with UE devices 108 indirectly (e.g., by way of the RAN resources) and may provide access to additional integrated MEC servers, one or more service access point (SAP) resources may communicate with UE devices 108 indirectly (e.g., by way of the RAN and/or TAP resources) and may provide access to still other integrated MEC servers, and so forth. In all of these examples, the MEC servers integrated within the network resources may implement certain network equipment 104 shown in configuration 100. Additionally, in some examples, other network resources may likewise assist in providing communication services for UE devices 108 and/or may provide access to MEC servers or other network equipment 104 in any manner as may serve a particular implementation.

Along with a provider network such as has been described, communication network 102 may further include elements of one or more additional networks external to the provider network (e.g., third-party networks associated with the Internet, etc.). Access to additional network equipment 104 (e.g., cloud servers, etc.) beyond the MEC servers of the provider network may be provided by these additional networks. Certain additional network elements within communication network 102 may be included within peer networks connected to the provider network by high bandwidth connections (e.g., direct fiber optic lines, etc.), such that certain network equipment 104 may be operated on the peer networks. Other network elements of communication network 102 may be associated with networks external to the provider network, such that other network equipment 104 may be implemented by cloud servers operated by cloud computing enterprises such as VERIZON (e.g., VERIZON Cloud), AMAZON (e.g., AMAZON Web Services (AWS)), MICROSOFT (e.g., MICROSOFT Azure), GOOGLE (e.g., GOOGLE Cloud Platform (GCP)), ORACLE (ORACLE Cloud), or the like.

As mentioned, network equipment 104 is deployed at distinct network facilities 106 distributed throughout communication network 102. Network facilities 106 are located at network sites at different geographic locations. The different geographic locations may be any locations suitable for deployment of network equipment 104 to support operation of communication network 102. Network facilities 106 may include any structures that house (e.g., enclose, support, etc.) network equipment 104. For example, network facilities 106 may include buildings, towers, etc. at which network equipment 104 is deployed.

Network facilities 106 are configured to provide one or more utilities for use by network equipment 104 deployed at those network facilities 106. As used herein, a "utility" may include anything that is useful to the deployment and/or operation of network equipment 104 at a network facility 106. For example, illustrative utilities may include physical space (e.g., floor space, shelf space, rack space, air space) at a network facility 106 at which network equipment 104 may be deployed, power (e.g., electrical power, backup electrical power, etc.) available at a network facility 106 and that may be provided for use by network equipment 104, electrically conductive connections at a network facility 106 (e.g., power outlets, cabling connections, etc.), ingress and/or egress data transport connections (e.g., a back haul connection) at a network facility 106, a temperature at a network facility 106 (e.g., air temperature in a room), a cooling utility at a network facility 106 that may be used to cool network equipment 104, and any other feature of a network facility 106 that may be used for deployment and/or operation of network equipment 104 at the network facility 106.

Utilities-based network management system 110 (system 110) may be configured to manage communication network 102 based at least in part on utilities at network facilities 106. To this end, system 110 may obtain and use utilities data 112 associated with the utilities to manage communication network 102, such as by performing a management operation 114 to manage communication network 102. Illustrative examples of utilities data 112 and management of communication network 102 based on utilities data 112 will now be described. The examples are illustrative. System 110 may be configured to obtain and use utilities data 112 to manage communication network 102 in other suitable ways.

Utilities data 112 may indicate any information about utilities at network facilities 106. For example, utilities data 112 may indicate availability (e.g., available capacity) and/or utilization (e.g., measured utilization, utilization margin, peak utilization, average utilization, etc.) of utilities at network facilities 106 and/or at geographic locations of the network facilities (e.g., a geographic area served by a power station that provides power to a network facility 106). Additionally or alternatively, utilities data 112 may include information that can be used by system 110 to derive information about utilities such as availability, utilization, and/or other information about utilities at network facilities 106. Examples of information about utilities that may be indicated by and/or derived from utilities data 116 include information about physical space at a network facility 106 (e.g., space availability, utilization, etc.), information about electrical power at a network facility 106 and/or geographic area associated with the network facility 106 (e.g., power availability, utilization, peak usage, average usage, backup power availability, historical and/or daily peak-to-average usage, etc.), information about electrically conductive connections at a network facility 106 (e.g., number, positioning, availability, and/or utilization of power outlets, cabling connections, etc.), information about ingress and/or egress data transport connections (e.g., ingress/egress availability, utilization, etc.), information about temperature at a network facility 106 (e.g., air temperature in a room and/or at specific regions or locations at a network facility 106), information about a cooling utility at a network facility 106 (e.g., cooling availability, utilization, cooling equipment capacity, etc.), and information about any other feature of a network facility 106 that may be used for deployment and/or operation of network equipment 104 at the network facility 106.

In certain examples, at least some utilities data 112 may indicate real-time information about utilities at network facilities 106. Such real-time information may represent real-time conditions of utilities at network facilities 106 as the conditions exist approximately at a moment in time that utilities data 112 indicating the conditions is obtained by system 110. In these examples, system 110 may obtain utilities data 112 in real-time, which may mean that utilities data 112 is obtained immediately and without undue delay, even if it is not possible for there to be absolutely zero delay.

In certain examples, at least some utilities data 112 may indicate availability and/or utilization of utilities at a network facility 106 as a dynamic function that may change over time. For example, power availability at a network facility 106 may be represented as a dynamic function that changes based on time of day, season, weather, etc.

System 110 may be configured to obtain utilities data 112 from any suitable source(s). For example, system 110 may be configured to obtain utilities data 112 from any computing system with which system 110 may communicate (e.g., by way of communication network 102 or another network), including a third-party computing system operated by a provider of a utility (e.g., a power company), a computing system that stores data representing information about network facilities 106 and/or utilities at network facilities 106 (static information such as a capacity of a utility at a network facility 106, historical information such as logs of utilization of a utility at a network facility 106, and/or real-time information such as current utilization of a utility at a network facility 106), and/or from any other computing system with which system 100 may communicate.

In certain examples, system 110 may be communicatively coupled to and configured to obtain sensor data from sensors at network facilities 106. The sensor data may represent and/or be a form of utilities data 112 that indicates information about utilities at network facilities 106 and/or from which system 110 may derive information about utilities at network facilities 106.

The sensors may include any type or types of sensors that may be deployed at network facilities 106 and that are capable of sensing conditions at network facilities 106 and providing sensor data indicative of information about the sensed conditions. For example, the sensors may include temperature sensors, power sensors (e.g., power meters such as electrical current meters), audio sensors (e.g., microphones), humidity sensors, atmospheric pressure sensors (e.g., barometers), and/or imaging sensors. The sensors may include or be implemented by any suitable devices, such as IoT devices for example.

Imaging sensors may be implemented by one or more imaging devices, which may include any suitable type or types of imaging devices. For example, imaging devices may include visible light imaging devices (e.g., cameras such as video cameras and/or still-frame cameras), depth imaging devices (e.g., time-of-flight depth cameras, light detection and ranging (LIDAR) devices, stereoscopic cameras, etc.), and thermal imaging devices (e.g., forward-looking infrared (FLIR) cameras, etc.).

Any set and/or configuration of sensors may be deployed at a network facility 106 and used to sense conditions of the network facility 106 and provide sensor data that indicates information about the sensed conditions. For example, multiple types of imaging devices may be deployed at a network facility 106 and used to capture different types of imagery of the network facility 106. For instance, imagery of the network facility 106 may include visible light images (e.g., color or grayscale images in which data points represent color or grayscale values in a color space), depth images (e.g., images in which data points represent depth values from a camera viewpoint to imaged surfaces), and/or thermal images (e.g., images in which data points represent temperatures of an imaged space) of the network facility 106. Such imagery may be represented as image data that is produced by one or more imaging devices.

Figure 2:
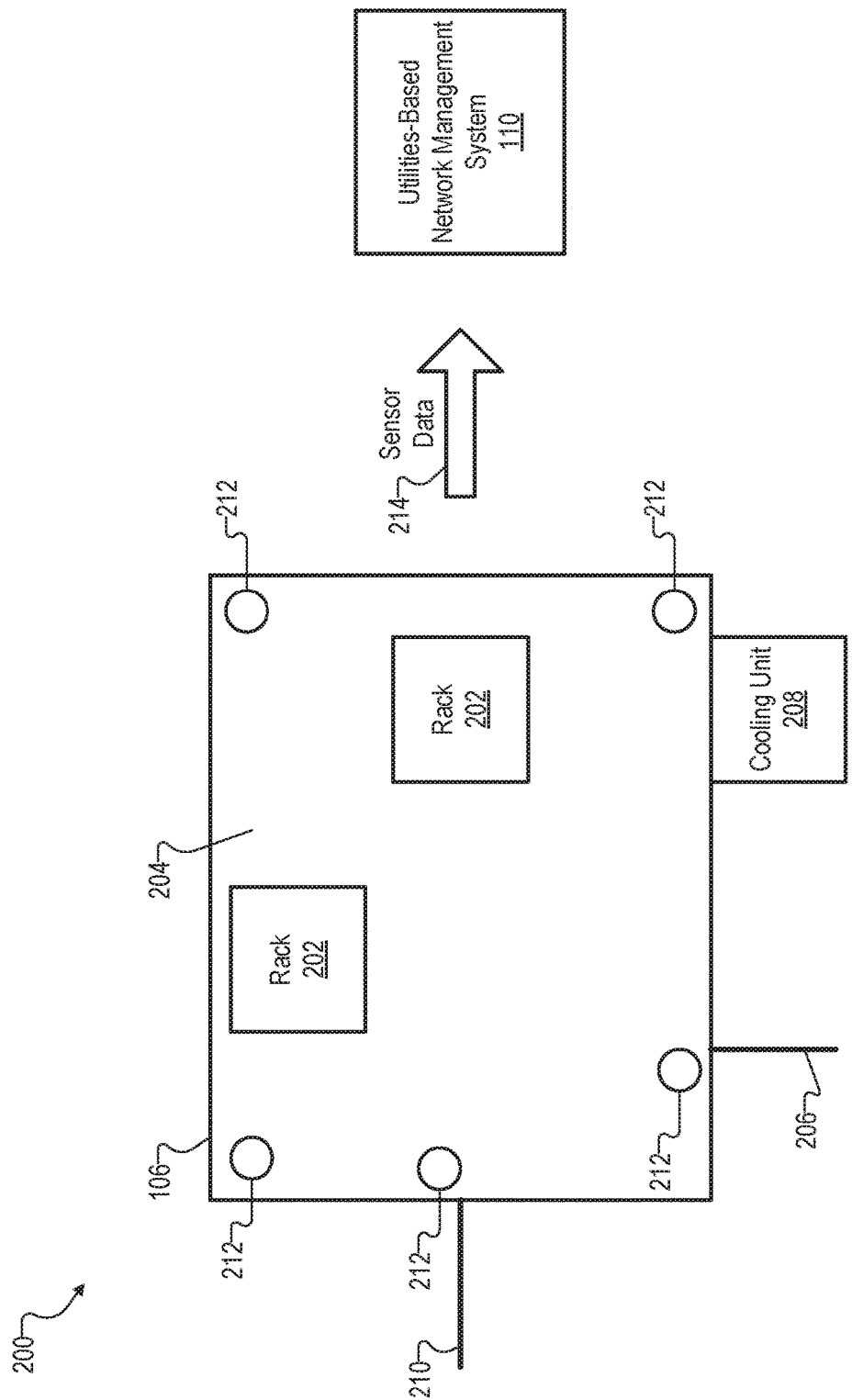
FIG. 2 shows an illustrative configuration of a network facility and a utilities-based network management system according to embodiments described herein.

FIG. 2 shows an illustrative configuration 200 of a network facility 106 and system 110. As shown, network facility 106 may include equipment racks 202 positioned within a space 204 (e.g., a floor space) in network facility 106. Racks 202 may house network equipment 104. Network facility 106 provides utilities for use by the network equipment 104, including space 204 that may be occupied by network equipment 104, incoming electrical power 206 that may be accessed and used by the network equipment 104, a cooling unit 208 that may cool the space 204 in network facility 106 (e.g., by forcing cool air into space 204), and a data ingress/egress connection 210 (e.g., a back haul connection) that may be used by the network equipment 104 to send and receive data to and from computing systems outside of the network facility 106. Network facility 106 may provide additional or alternative utilities not expressly shown in FIG. 2.

Network facility 106 further includes sensors 212 deployed at network facility 106. Sensors 212 may include any suitable combination and configuration of a type or types of sensors, including any of the illustrative sensors described herein. Sensors 212 are configured to sense conditions at network facility 106, generate sensor data 214 indicating the sensed conditions, and transmit the sensor data 214 to system 110.

One or more sensors 212 may include or be implemented as one or more imaging devices configured to capture and provide image data representing imagery of network facility 106 to system 110. The imagery may include any type or types of imagery of network facility 106, including any combination of different types of imagery of network facility 106. For example, the imagery may include one or more of color imagery, depth imagery, and/or thermal imagery of network facility 106. The imagery may depict features and/or conditions at network facility 106, such as a power meter, a temperature gauge, network equipment 104, racks, shelves, cooling vents, electrical connections, physical space, temperature, etc.

Figure 3:
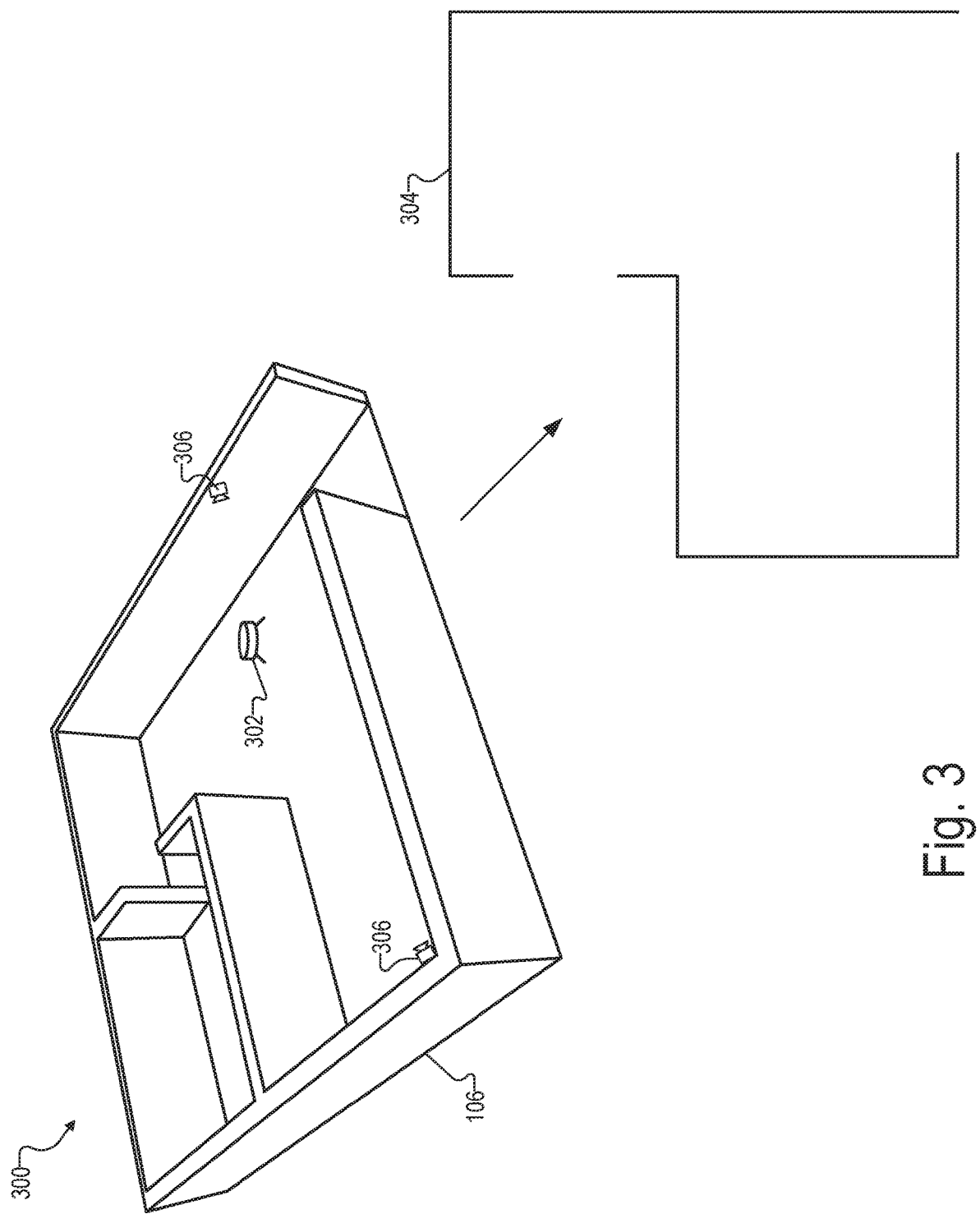
FIG. 3 shows an illustrative configuration for capturing imagery of a network facility according to embodiments described herein.

FIG. 3 shows an illustrative configuration 300 for capturing imagery of a network facility 106. In configuration 300, a space mapping device 302, such as a LIDAR device, is deployed at network facility 106 and is configured to capture depth images that may be used to generate a map of the physical space in a room of network facility 106, such as a floor space map 304 of the room. Configuration 300 further includes thermal imaging devices 306 deployed in network facility 106 and configured to capture thermal images that may be used to generate one or more maps of temperatures (e.g., a heat map) at network facility 106.

While configuration 300 shows space mapping device 302 and thermal imaging devices 306 deployed at network facility 106, this is illustrative only. Other examples may include additional or alternative types of imaging devices and/or other sensors. For example, although not shown, color imaging devices may be deployed at network facility 106 and configured to capture color images that may be used to generate one or more maps of visible light color values at network facility 106. For example, color imaging devices may be part of thermal imaging devices 306 or space mapping device 302, or color imaging devices may be separate devices deployed at network facility 106.

As mentioned, system 110 may obtain and use utilities data 112 (e.g., sensor data 214 such as image data representing imagery captured at a network facility 106) to manage communication network 102. Management of communication network 102 by system 110 may include system 110 performing operations to actively manage communication network 102 (e.g., by adjusting operation of network equipment 104 of communication network 102) and/or performing operations to facilitate management of communication network 102 by another entity (e.g., by an operator of communication network 102). Such operations may be referred to as network management operations.

System 110 may be implemented by computer resources such as servers, processors, memory devices, storage devices, communication interfaces, and so forth. For example, system 110 may be included within or otherwise associated with one or more multi-access servers or other computing systems (e.g., MEC servers, cloud servers, local servers, etc.) described herein. As such, a computing system implementing system 110 may be configured to manage communication network 102 by performing one or more network management operations.

Figure 4:
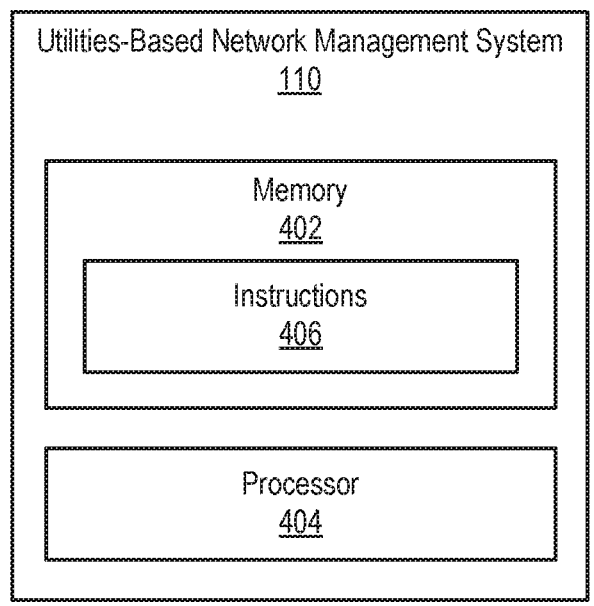
FIG. 4 shows an illustrative utilities-based network management system according to embodiments described herein.

FIG. 4 shows an illustrative utilities-based network management system 110. As shown, system 110 may include, without limitation, a memory 402 and a processor 404 selectively and communicatively coupled to one another. Memory 402 and processor 404 may each include or be implemented by computer hardware that is configured to store and/or execute computer software. Various other components of computer hardware and/or software not explicitly shown in FIG. 4 may also be included within system 110. In some examples, memory 402 and processor 404 may be distributed between multiple devices and/or multiple locations.

Memory 402 may store and/or otherwise maintain executable data used by processor 404 to perform any of the functionality of system 110 described herein. For example, memory 402 may store instructions 406 that may be executed by processor 404. Memory 402 may be implemented by one or more memory or storage devices, including any memory or storage devices described herein, that are configured to store data in a transitory or non-transitory manner. Instructions 406 may be executed by processor 404 to cause system 110 to perform any of the functionality of system 110 described herein. Instructions 406 may be implemented by any suitable application, software, code, and/or other executable data instance. Additionally, memory 402 may also maintain any other data accessed, managed, used, and/or transmitted by processor 404.

Processor 404 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 404 (e.g., when processor 404 is directed to perform operations represented by instructions 406 stored in memory 402), system 110 may perform functions associated with network management as described herein and/or as may serve a particular implementation.

In certain examples, system 110 may obtain utilities data 112 for a network facility 106, determine a utilization of network facility 106 based on utilities data 112, and perform a management operation 114 for communication network 102 based on the determined utilization of the network facility 106. Illustrative examples of these functions of system 110 will now be described. While certain of the examples refer to a utilization of a network facility 106 being determined and used to perform a management operation, any suitable number and combination of utilizations of any suitable number and combination of network facilities 106 may be determined and used to perform any suitable number and combination of management operations. While a network facility 106 is referred to in the examples, the functionality may be applied to a single network facility 106 (e.g., based on utilities data 112 specific to the single network facility 106) and/or multiple network facilities 106 (e.g., based on an aggregate of utilities data 112 for multiple network facilities 106).

System 110 may obtain utilities data 112 in any suitable way and from any suitable source(s), including in any of the ways and from any of the sources described above. As described, in certain examples utilities data 112 may include or be derived from sensor data such as image data provided by imaging devices deployed at network facilities 106.

System 110 may determine a utilization of a network facility 106 based on the utilities data 112. System 110 may be configured to perform any suitable analytical operations (e.g., historical analysis, predictive analytics, etc.) on utilities data 112 to determine a utilization of the network facility 106. In certain examples, system 110 may be configured to apply artificial intelligence such as a machine learning algorithm (e.g., a trained neural network) to utilities data 112 as part of determining a utilization of the network facility 106.

A utilization of a network facility 106 may be any metric that indicates a use of utilities, network equipment 104, and/or other resources at the network facility 106. A utilization of a network facility 106 may be represented in any way suitable to quantify and/or qualify the use of utilities, network equipment 104, and/or other resources at the network facility 106. For example, the utilization may be represented as a metric value representing a quantified amount of use, a percentage or ratio representing how much of available utilities or other resources are being used, a margin representing how much of available utilities or other resources are not being used, a rating value representing a quality or efficiency with which utilities or other resources are being used, or any other suitable representation of the use of utilities, network equipment 104, and/or other resources at the network facility 106. In certain examples, a utilization of a network facility 106 may be represented as one or more maps that correlate utilization information to locations at the network facility 106. Examples of such maps are described herein.

A utilization of a network facility 106 may represent a past, current (e.g., real-time), and/or predicted utilization of the network facility 106. For example, system 110 may be configured to determine a past utilization of the network facility 106 based on historical utilities data 112, a current utilization of the network facility 106 based on current utilities data 112, and/or a predicted future utilization of the network facility 106 based on historical utilities data 112 (e.g., patterns of utilizations identified in historical utilities data 112) or a combination of historical and current utilities data 112.

In certain examples, a utilization of a network facility 106 may represent an overall utilization of the network facility 106 that is determined based on a combination of different types of utilizations of the network facility 106. For example, system 110 may determine multiple different types of utilizations associated with the network facility 106, such as utilizations of utilities, network equipment 104, and/or other resources of the network facility 106, and combine the multiple different types of utilizations to determine an overall utilization of the network facility 106. System 110 may combine different types of utilizations in any suitable way to determine an overall utilization of the network facility 106, including by weighting the contributions of the different types of utilizations to the overall utilization as may suit a particular implementation.

A utilization of a network facility 106 may include a utilization of a utility at the network facility 106, such as a utilization of any of the illustrative utilities described herein. For example, a utilization of a utility may include a utilization of power (e.g., electrical power), physical space, cooling, electrical connections, ingress/egress connections, or any other utility at the network facility 106.

A utilization of a utility may be any metric that indicates a use of the utility at the network facility 106. The utilization of the utility may be represented in any way suitable to quantify and/or qualify the use of the utility at the network facility 106. For example, the utilization may be represented as a metric value representing a quantified amount of use, a percentage or ratio representing how much of an available utility is being used, a margin representing how much of an available utility is not being used, a rating value representing a quality or efficiency with which the utility is being used, or any other suitable representation of the use of the utility at the network facility 106. A utilization of a utility may represent a past, current (e.g., real-time), and/or predicted utilization of the utility at the network facility 106.

In certain examples, a utilization of a utility at a network facility 106 may be represented as one or more maps. As an example, system 110 may be configured to use image data such as space data (e.g., depth data) captured at the network facility 106 to generate a map (e.g., a depth map, a floor space map, etc.) that represents a utilization of physical space at the network facility 106. As another example, system 110 may be configured to use image data such as thermal data captured at the network facility 106 to generate a temperature map (e.g., a heat map) that represents a utilization of temperature and/or a cooling utility at the network facility 106. As another example, system 110 may be configured to use image data such as color data captured at the network facility 106 to generate a texture map that represents a utilization at the network facility 106, such as a utilization of network equipment 104 (types of network equipment, operating status of network equipment, etc.) at the network facility 106.

In certain examples, system 110 may be configured to combine different types of image data captured at the network facility 106 to generate one or more maps that represent utilizations of one or more utilities at the network facility 106. As an example, a utilization of temperature at a network facility 106 may be represented as a heat map in which sensed temperatures at the network facility 106 are mapped to spatial locations at the network facility 106. To generate such a heat map, system 110 may be configured to co-register temperatures sensed by thermal imaging devices 306 and represented in thermal imagery with a map of the physical space of network facility 106 (e.g., a physical space map that is generated from space data provided by space mapping device 302) such that the temperatures are associated with specific locations within the physical space of network facility 106. For example, temperature data points sensed by thermal imaging devices 306 may be mapped to locations on floor space map 304. The co-registration of physical space data and thermal image data may be used to form a two-dimensional (2D) or three-dimensional (3D) heat map of network facility 106.

Figure 5:
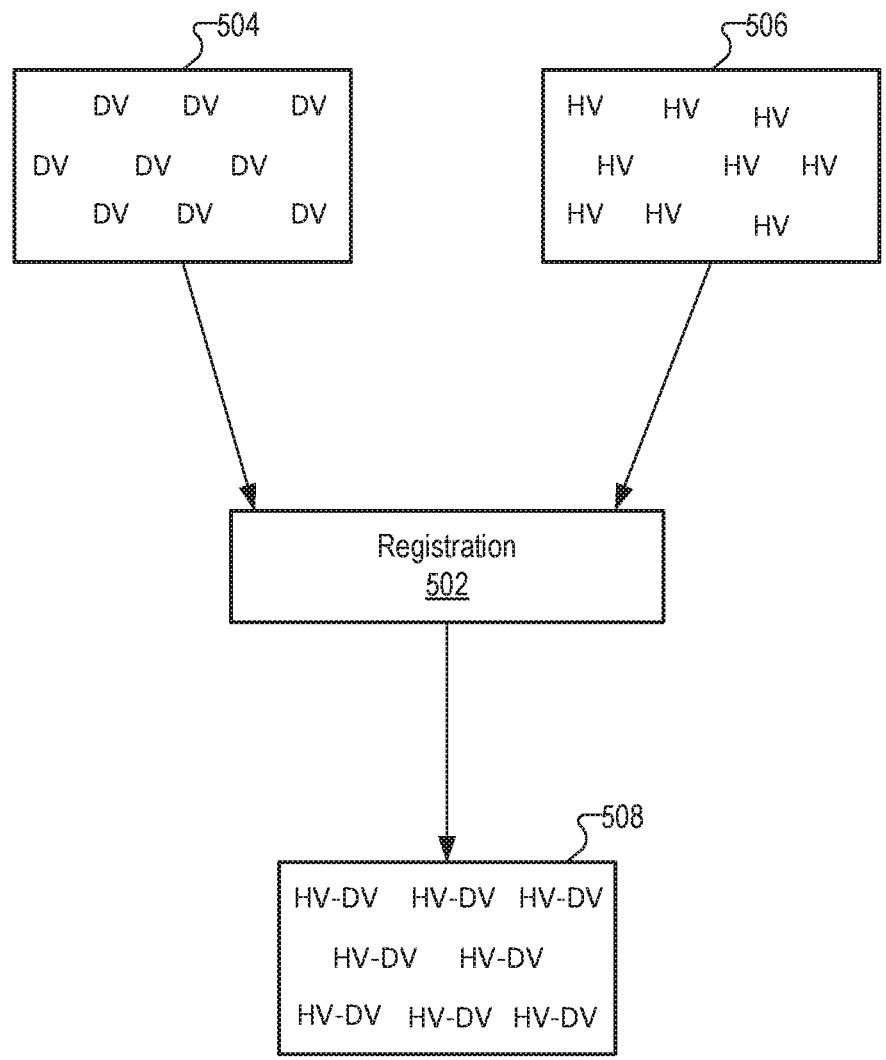
FIG. 5 shows an illustrative registration of a depth image and a thermal image to form a heat map of a network facility according to embodiments described herein.

FIG. 5 shows an illustrative registration 502 of a depth image 504 and a thermal image 506 captured by imaging devices at a network facility 106 to form a co-registered heat map 508 in which temperature data points are mapped to depth data points. In depth image 504, depth data points are represented as "DV". In thermal image 506, temperature data points are represented as "HV". In the co-registered heat map 508, mappings of temperature data points to depth data points are represented as "HV-DV". The co-registered heat map 508 may be a 2D map or a 3D heat map. The co-registered heat map 508 may be formed from any suitable number of depth images 504 and thermal images 506 of a network facility 106, including depth images 504 and thermal images 506 captured from the same imaging viewpoint, from different imaging viewpoints, at synchronized capture times, or an different capture times (e.g., to show a progression heat values over time).

In certain examples, system 110 may be configured to co-register color image data with thermal image data and/or space data to form one or more maps representative of a utilization of one or more utilities at the network facility 106. To generate such a map, system 110 may be configured to co-register color data provided by color imaging devices and representing color imagery with a map of the physical space of network facility 106 (e.g., a physical space map the is generated from space data provided by space mapping device 302) such that sensed color values are associated with specific locations within the physical space of network facility 106. For example, color data points sensed by the color imaging devices may be mapped to locations on floor space map 304. The co-registration of physical space data and color image data may be used to form a two-dimensional (2D) or three-dimensional (3D) texture map of network facility 106.

As mentioned, such illustrative maps may represent a utilization of a network facility 106 (e.g., a utilization of a utility at the network facility 106). In certain examples, system 110 may be configured to analyze such maps of sensed data at network facility 106 to determine a utilization of a network facility 106 (e.g., a utilization of a utility at the network facility 106). System 110 may be configured to analyze the maps in any suitable way, including by providing maps as input to an artificial intelligence algorithm such as a machine learning algorithm (e.g., a trained neural network) that is configured to process the maps and output potential utilizations of the network facility 106 that are determined based on the maps. Confidence scores for the potential utilizations may also be provided. From the potential utilizations, system 110 may determine a utilization of the network facility 106, which may be represented in any of the illustrative ways described herein and/or in any other suitable way.

In addition to using utilities data 112 to determine a utilization of a network facility 106, in certain examples system 110 may be configured to use any other suitable data (e.g., in combination with the utilities data 112) to determine the utilization of the network facility 106. Illustrative examples of additional data that system 110 may use to determine a utilization of a network facility 106 include, without limitation, network data (e.g., data indicating use and/or performance of resources of communication network 102 such as network equipment 104), application data, RAN data, subscription data, and environmental data.

Network data may indicate information about the use and/or performance of one or more resources of communication network 102. For example, network data may indicate utilization of network equipment 104, processors (e.g., CPUs), memory, etc. Network data may additionally or alternatively indicate network performance parameters such as network traffic, throughput, and latency. System 110 may be configured to use such network data together with other data (e.g., utilities data 112, subscription data, application data, etc.) to determine utilization of a network facility 106 and/or perform network management operations.

Application data may indicate information about applications running on network equipment 104. For example, application data may indicate actual network traffic corresponding to applications, required latencies and/or throughput for applications, etc. System 110 may be configured to use such application data together with other data (e.g., utilities data 112, subscription data, network data, etc.) to determine utilization of a network facility 106 and/or perform network management operations.

RAN data may indicate any information about resources of a RAN, including information about performance of RAN resources. For example, RAN nodes and optionally core network elements may exchange RAN data as part of new radio (NR) self-optimizing network (SON) operations. For instance, RAN nodes may exchange and use RAN data for handovers of UE devices 108 and/or managing operation of certain RAN resources. RAN data, or at least a portion of the RAN data, may be provided to system 110 and used by system 110 to determine a utilization of network equipment 104 such as one or more MEC servers. System 110 may use the RAN data to determine a utilization of a network facility 106 that houses network equipment 104 such as MEC servers. System 110 may be configured to manage operation of the MEC servers based on the determined utilization, such as by turning MEC servers or components of MEC servers on, off, up, or down (e.g., to optimize power utilization at the network facility 106). In certain examples, system 110 may be configured to use RAN data together with other data (e.g., utilities data 112, subscription data, application data, etc.) to determine utilization of a network facility 106 and/or perform network management operations.

Subscription data may indicate subscription information about network users, such as information indicating subscriptions of users to data and/or services that may be accessed by way of communication network 102. For example, subscription data may indicate a number of subscribed users and types of services to which users are subscribed. For example, a video service provider may provide subscription data to a network provider such that system 110 has access to the subscription data. System 110 may be configured to use the subscription data to determine a number of different types of subscribers located in a geographic area of communication network 102 (e.g., in a cell of communication network 102). System 110 may be configured to use such subscription data together with other data (e.g., utilities data 112, subscription data, application data, etc.) to determine utilization of a network facility 106 and/or perform network management operations (e.g., powering on or off network resources such as specific MEC servers or specific components of MEC servers when subscribers to a service provided by the MEC servers or components of the MEC servers are not within a geographic location served by the MEC servers).

Environmental data may indicate any information about environmental conditions or factors associated with a network facility 106. Illustrative examples of such environmental information include, without limitation, information about outside air temperature, storm conditions, actual weather, forecast weather, etc. associated with a geographic location at which the network facility 106 is located. System 110 may be configured to use such environmental data together with other data (e.g., utilities data 112, subscription data, application data, etc.) to determine utilization of a network facility 106 and/or perform network management operations.

System 110 may be configured to identify and perform any suitable network management functions based on a determined utilization of a network facility 106, such as a utilization of a utility at the network facility 106. The network management functions may be configured to effectuate or facilitate optimization of utilizations of network facilities 106. Examples of network management operations that may be performed by system 110 will now be described. The examples are illustrative. System 110 may be configured to perform additional or alternative network management operations based on utilization of a network facility 106 in other examples.

Based on utilization of a network facility 106, system 110 may perform network management operations to facilitate optimized deployment of network equipment 104. The deployment may include deploying new equipment at one or more network facilities 106 and/or reconfiguring an existing deployment of network equipment within a network facility 106 and/or across network facilities 106. System 110 may facilitate such optimized deployment in any suitable way. For example, system 110 may generate and output information about an optimized deployment that may be used by another entity, such as an operator of communication network 102, to effectuate the optimized deployment. The information may represent a recommended deployment and/or deployment options in any suitable way, such as with a deployment metric that is determined and output by system 110 and represents a rating of a deployment option. In certain examples, the deployment metric may represent a quantified optimization of utilization of one or more utilities at a network facility 106, such as an estimated increase or decrease in power consumption, space utilization, and/or cooling requirements at the network facility 106 that would result from an optimized deployment.

In certain examples, system 110 may be configured to compare a deployment metric for a deployment option with one or more deployment metrics for one or more other deployment options. For example, system 110 may compare a deployment metric for deployment of additional network equipment 104 at a network facility 106 with one or more additional deployment metrics for deployment of the additional network equipment 104 at one or more additional network facilities 106. Based on such a comparison, system 110 may generate and provide data indicating a recommended deployment of the additional network equipment 104. In this or any other suitable way, system 110 may analyze determined utilizations of network facilities 106, determine a recommended location for an install of network equipment 104, and output data representing the recommendation and optionally information supporting the recommendation.

Such data output by system 110 may be configured to facilitate optimization of communication network 102 in one or more ways. For example, the data may facilitate plans for upgrades to network equipment 104 and/or utilities at network facilities 106. As another example, the data may facilitate optimized design for deployment of network equipment 104 at a network facility 106. The optimized design may optimize the utilization of utilities at the network facility 106, such as by appropriately positioning and spacing the network equipment 104 at the network facility 106 in a manner that optimizes utilization of utilities available at the network facility 106.

The data output by system 110 may also be configured to indicate potential problems, such as current and predicted potential problems associated with utilization of utilities at network facilities 106. In certain examples, a network management operation performed by system 110 may include providing an alert that a utilization of a network facility 106 or a utility at the network facility 106 has reached a defined threshold utilization (e.g., 80% of available space, power, or temperature is being utilized).

Based on utilization of a network facility 106, system 110 may generate and output data representing a network management operation to be performed. System 110 may provide the data to any entity that may perform or facilitate performance of the network management operation to be performed. As an example, system 110 may provide the data to a computing system that is configured to present the data to a network operator. As another example, system 110 may provide the data to a computing system (e.g., network equipment) that is configured to perform the network management operation. The providing of the data to such a computing system may in effect direct the computing system to perform the network management operation. For example, system 110 may direct a component of network equipment 104 to adjust an operation of network equipment 104, such as by changing a state of operation network equipment 104 or a component of network equipment 104. The change in the state of operation may include, for example, powering off, powering on, turning up (e.g., increasing operation intensity, frequency, etc. to consume more power), turning down (e.g., decreasing operation intensity, frequency, etc. to consume less power), transitioning between an active mode and a standby mode of operation, etc. of network equipment 104 or a component of network equipment 104.

Such network management operations may be determined and performed based on determined utilizations of network facilities 106 and may be configured to facilitate optimizing utilizations of network facilities 106 in one or more ways. For example, the network management operations may optimize space and/or power utilization of network facilities 106 for given traffic patterns (e.g., historical, current, and/or predicted traffic patterns) of communication network 102. To illustrate, the network management operations may optimize the use of active/standby modes of operation of network equipment 104 (e.g., MEC servers) for a certain traffic utilization.

Based on utilization of a network facility 106, system 110 may perform network management operations to manage workload of network equipment 104 deployed at network facilities 106. For example, system 110 may move workload around among network equipment 106 in a manner that is based on a determined utilization of a network facility 106 and is configured to optimize (e.g., load balance) the utilization of the network facility 106. To this end, workload management operations may be determined and performed based at least in part on utilization of one or more utilities (e.g., power) at network facilities 106 and may adjust workload to optimize the utilization. For example, system 110 may load balance workload and/or the utilization of a utility such as power based on available power. For instance, system 110 may dynamically load balance based at least in on available power and/or space utilizations (e.g., in addition to in combination with basing the load balancing on resource utilization such as processor, memory, throughput, latency, etc.). Such load balancing may include routing more data traffic where additional power is available and routing less data traffic to where power is scarce.

To illustrate one example of system 110 managing communication network 102 based on utilization of utilities at network facilities 106, system 110 may obtain sensor data that includes image data representing imagery of a network facility 106. System 110 may analyze the image data and, based on the analysis, determine a utilization of a utility at the network facility 106, such as a utilization of space, power, or temperature at the network facility 106 relative to available space, power, or temperature at the network facility 106. Based on the determined utilization, system 110 may identify and perform a network management operation for communication network 102. The network management operation may include any of the illustrative network management operations described herein or any other suitable network management operation. For example, system 110 may determine an optimization opportunity and generate and output data representing the optimization opportunity. In an example, the optimization opportunity may be a recommended physical repositioning of network equipment 104 within a network facility 106 that would better utilize a space or temperature utility available at the network facility 106. In another example, the optimization opportunity may be a recommended physical location for placement of new network equipment 104 within a network facility 106 that would efficiently utilize a space or temperature utility available at the network facility 106.

In certain examples, the network management operation may include system 110 directing network equipment 104 to perform an operation to adjust the determined utilization. For example, in response to the determined utilization satisfying a defined threshold, system 110 may direct network equipment 104 at a network facility 106 (e.g., a MEC server at a MEC server facility) to move current and/or future processing tasks from the network equipment 104 at the network facility 106 to other network equipment 104 at one or more other network facilities 106 (e.g., from a MEC server to a cloud server).

In certain examples, the network management operation may include system 110 prioritizing tasks and/or specific network equipment for performing tasks based on a determined utilization. For example, system 110 may prioritize what tasks take precedence over other tasks at times of peak power consumption. This may result in or be based on a tradeoff between network equipment 104 (or a task) that uses a certain amount of power versus other network equipment (or tasks) that use relatively less power.

In certain examples, system 110 may be configured to perform management operations in real-time based on obtained utilities data 112, which may mean that the management operations are performed immediately and without undue delay, even if it is not possible for there to be absolutely zero delay. This may help ensure that management operations are performed based on utilities data 116 that is relevant to the management operations.

In certain examples, system 110 may perform a network management operation based on a predictive utilization of a utility at a network facility 106. For example, system 110 may determine a predictive utilization of heat (e.g., predictive heat generation) at the network facility 106 and may identify and perform a network management operation based on the predicted utilization. For instance, system 100 may perform a management operation configured to reduce the utilization of network equipment 104 at the network facility 106 in order to reduce the heat generated at the network facility 106, which may prevent the actual heat generation from reaching the predicted heat generation.

Examples of utilities-based network management described herein may be particularly useful for network facilities 106 that are located at an edge of a provider network in order to support low-latency communication with UE devices 108. Such network facilities 106 may house network equipment 104 such as MEC servers that require significant power and generate significant heat, but may be located where available utilities are limited (e.g., where only a finite amount of power is available at a network site). System 110 may determine utilization of a utility at such a network facility 106 based on utilities data 112 and perform a management operation configured to optimize the utilization of the utility.

Figure 6:
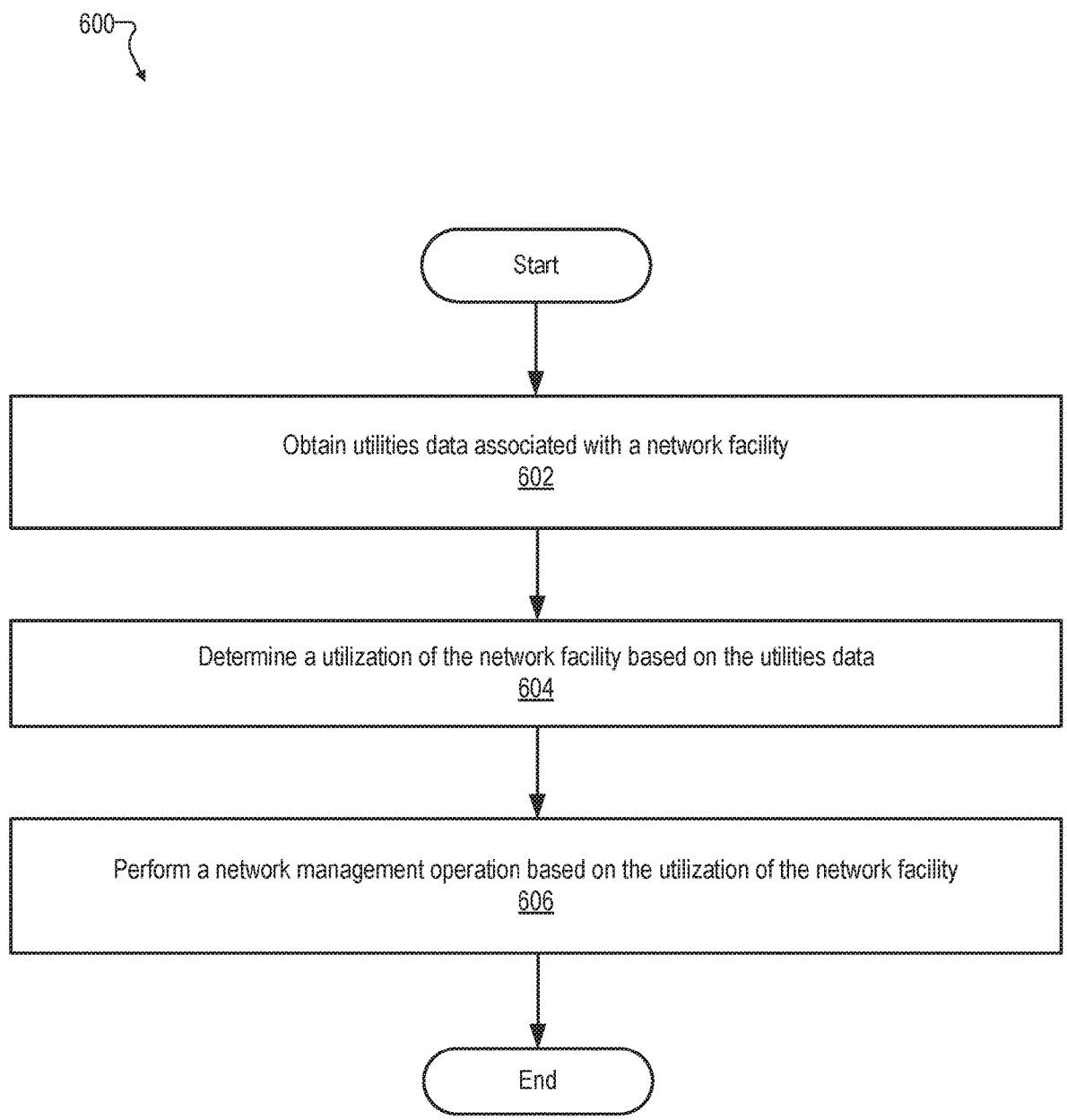
FIGS. 6-7 show illustrative methods for network management according to embodiments described herein.

FIG. 6 illustrates an example method 600. While FIG. 6 illustrates example operations according to one embodiment, other embodiments may omit, add to, reorder, combine, and/or modify any of the operations shown in FIG. 6. In some examples, multiple operations shown in FIG. 6 or described in relation to FIG. 6 may be performed concurrently (e.g., in parallel) with one another, rather than being performed sequentially as illustrated and/or described. One or more of the operations shown in FIG. 6 may be performed by a network management system such as system 110 and/or any implementation thereof.

In operation 602, a network management system obtains utilities data associated with a network facility. Operation 602 may be performed in any of the ways described herein.

In operation 604, the network management system determines a utilization of the network facility based on the utilities data. Operation 604 may be performed in any of the ways described herein.

In operation 606, the network management system performs a network management operation based on the utilization of the network facility. Operation 606 may be performed in any of the ways described herein.

Figure 7:
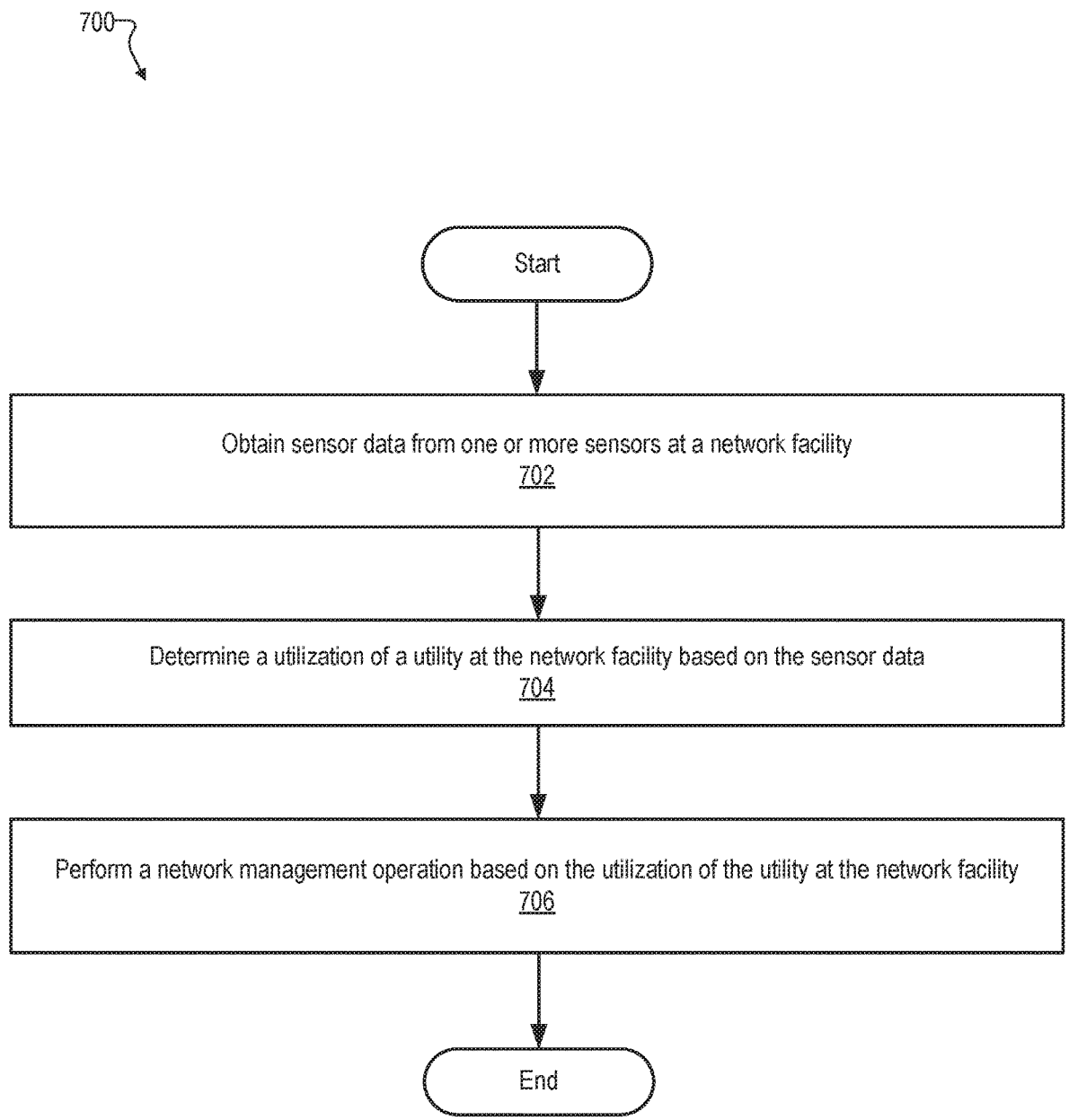

FIG. 7 illustrates an example method 700. While FIG. 7 illustrates example operations according to one embodiment, other embodiments may omit, add to, reorder, combine, and/or modify any of the operations shown in FIG. 7. In some examples, multiple operations shown in FIG. 7 or described in relation to FIG. 7 may be performed concurrently (e.g., in parallel) with one another, rather than being performed sequentially as illustrated and/or described. One or more of the operations shown in FIG. 7 may be performed by a network management system such as system 110 and/or any implementation thereof.

In operation 702, a network management system obtains sensor data from one or more sensors at a network facility. The sensor data may include one or more types of sensor data such as image data representing imagery of the network facility. Operation 702 may be performed in any of the ways described herein.

In operation 704, the network management system determines a utilization of a utility at the network facility based at least in part on the sensor data (e.g., based at least in part on the image data). Operation 704 may be performed in any of the ways described herein.

In operation 706, the network management system performs a network management operation based on the utilization of the utility at the network facility. Operation 706 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 8:
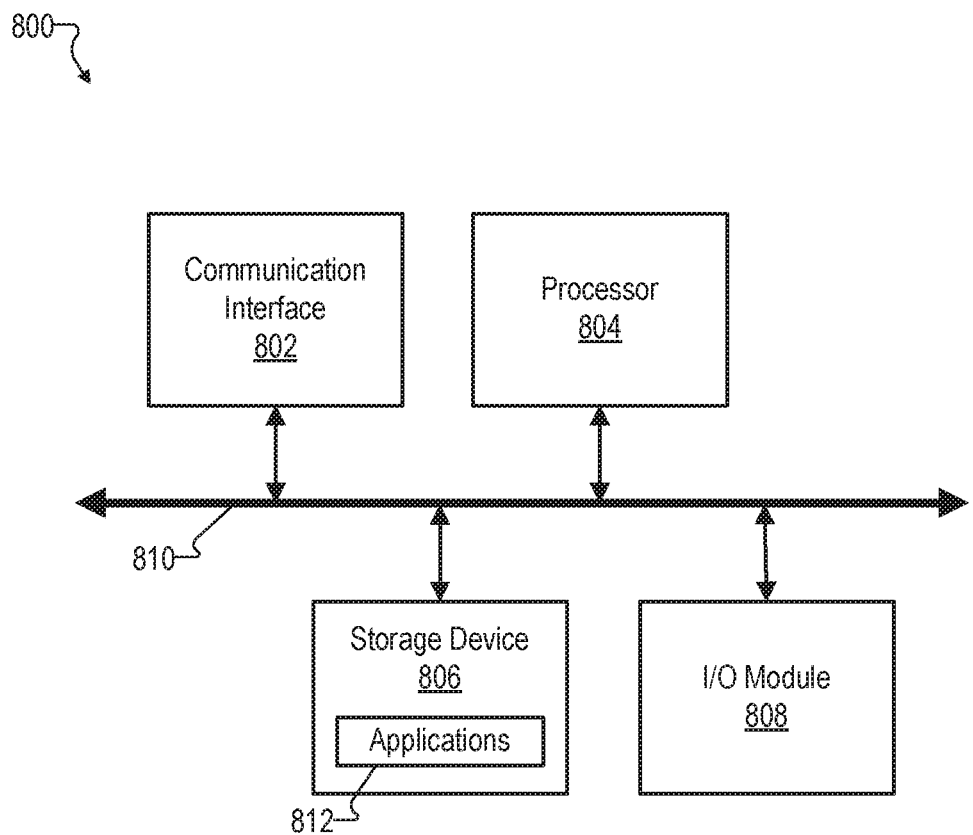
FIG. 8 shows an illustrative computing device according to embodiments described herein.

FIG. 8 shows an illustrative computing device 800 that may be specifically configured to perform one or more of the processes described herein. For example, computing device 800 may include or implement (or partially implement) a utilities-based network management system such as system 110 or any component included therein (e.g., a client exposure service system such as client exposure service system 402, a service registry system such as service registry system 404, a network anchor service system such as network anchor service system 406, a server selection system such as server selection system 408, etc.), an application development system such as application development system 412, a multi-access server such as one of multi-access servers 304, a client device such as one of client devices 306, or any other computing systems or devices described herein.

As shown in FIG. 8, computing device 800 may include a communication interface 802, a processor 804, a storage device 806, and an input/output (I/O) module 808 communicatively connected via a communication infrastructure 810. While an illustrative computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processor 404 of system 110. Likewise, memory 402 of system 110 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   obtaining, by a network management system, sensor data from one or more sensors at a network facility at which network equipment of a communication network is deployed, the sensor data including image data representing imagery of the network facility, the imagery of the network facility comprising a thermal image representing temperatures at the network facility and a depth image representing depth values of imaged surfaces at the network facility;
   determining, by the network management system and based on a mapping of the temperatures represented by the thermal image to the depth values represented by the depth image, a utilization of a utility at the network facility; and performing, by the network management system and based on the utilization of the utility at the network facility, a management operation for the communication network.

2. The method of claim 1, wherein:
the communication network comprises a provider network operated by a network provider;
the network facility is located at an edge of the provider network; and
the network equipment comprises a multi-access edge computing (MEC) server deployed at the network facility.

3. The method of claim 1, wherein the utilization of the utility at the network facility comprises a utilization of electrical power at the network facility.

4. The method of claim 1, wherein the utilization of the utility at the network facility comprises a utilization of physical space available at the network facility.

5. The method of claim 1, wherein the utilization of the utility at the network facility comprises a utilization of a cooling utility at the network facility.

6. The method of claim 1, wherein the utilization of the utility at the network facility is represented as a three-dimensional (3D) map that correlates utility utilization information to locations at the network facility.

7. The method of claim 1, wherein the utilization of the utility at the network facility is represented as a heat map that correlates imaged thermal data to imaged locations at the network facility, the imaged locations at the network facility represented as data points in the depth image.

8. The method of claim 1, wherein the imagery of the network facility further comprises color imagery of the network facility.

9. The method of claim 1, wherein:
determining the utilization of the utility at of the network facility comprises:
generating a three-dimensional (3D) heat map based on the depth image and the thermal image; and
using the 3D heat map to determine the utilization of the utility at the network facility.

10. The method of claim 1, wherein performing the management operation for the communication network comprises generating a deployment metric for deployment of additional network equipment at the network facility.

11. The method of claim 10, wherein performing the management operation for the communication network further comprises:
comparing the deployment metric for deployment of additional network equipment at the network facility with one or more additional deployment metrics for one or more additional network facilities; and
generating a recommended deployment of the additional network equipment based on the comparing.

12. The method of claim 1, wherein performing the management operation for the communication network comprises performing load balancing based at least in part on the utilization of the utility at the network facility.

13. The method of claim 1, wherein performing the management operation for the communication network comprises directing a component of the network equipment to change a state of operation based at least in part on the utilization of the utility at the network facility.

14. The method of claim 1, embodied as computer-executable instructions on at least one non-transitory computer-readable medium.

15. A system comprising:
a memory storing instructions; and
a processor communicatively coupled to the memory and configured to execute the instructions to:
obtain sensor data from one or more sensors at a network facility at which network equipment of a communication network is deployed, the sensor data including image data representing imagery of the network facility, the imagery of the network facility comprising a thermal image representing temperatures at the network facility and a depth image representing depth values of imaged surfaces at the network facility;
determine, based on a mapping of the temperatures represented by the thermal image to the depth values represented by the depth image, a utilization of a utility at the network facility; and
perform, based on the utilization of the utility at the network facility, a management operation for the communication network.

16. The system of claim 15, wherein:
the communication network comprises a provider network operated by a network provider;
the network facility is located at an edge of the provider network; and
the network equipment comprises a multi-access edge computing (MEC) server deployed at the network facility.

17. The system of claim 15, wherein:
the utilization of the utility at the network facility comprises a utilization of electrical power at the network facility; and
the management operation is configured to facilitate an optimization of the utilization of electrical power at the network facility.

18. The system of claim 15, wherein:
the utilization of the utility at the network facility comprises a utilization of physical space at the network facility; and
the management operation is configured to facilitate an optimization of the utilization of physical space at the network facility.

19. The system of claim 15, wherein:
the utilization of the utility at the network facility comprises a utilization of air temperature at the network facility; and
the management operation is configured to facilitate an optimization of the utilization of air temperature at the network facility.

20. A system comprising:
one or more sensors deployed at one or more network facilities at which network equipment of a communication network is deployed; and
a network management system communicatively coupled to the one or more sensors and configured to:
obtain sensor data from the one or more sensors, the sensor data including image data representing imagery captured at the one of more network facilities, the imagery of the network facility comprising a thermal image representing temperatures at the network facility and a depth image representing depth values of imaged surfaces at the network facility;
determine, based on a mapping of the temperatures represented by the thermal image to the depth values represented by the depth image, a utilization of each of the one or more network facilities; and perform, based on the utilization of each of the one or more network facilities, a management operation for the communication network.

* * * * *